United States Patent Office 3,282,885
Patented Nov. 1, 1966

3,282,885
PROCESSING POLYACETALS
Erich Schwartz, Mannheim, Ernst Ricker, Frankenthal, Pfalz, and Franz Schmidt, Mannheim, Germany, assignors to Badische Anilin- & Soda-Fabrik Aktiengesellschaft, Ludwigshafen (Rhine), Germany
No Drawing. Filed Sept. 17, 1964, Ser. No. 397,305
Claims priority, application Germany, Sept. 28, 1963, B 73,682
4 Claims. (Cl. 260—45.7)

This invention relates to a process for the working up of polyacetals obtained by polymerizing cyclic acetals, particularly polyoxymethylenes based on trioxane. It relates particularly to a process for inactivating the cationic catalyst used in the polymerization which remains in the polymers after the polymerization and may unfavorably affect the stability of the polymer.

It is known that polyoxymethylene may be prepared by the polymerization of trioxane by means of cationic catalysts, for example with acids or acid compounds and particularly with boron trifluoride or its coordination complexes, for example with diethyl ethers. Trioxane may also be copolymerized for example with cyclic ethers or acetals or also with linear polyacetals with the same catalysts. The copolymers consist mainly of thermally stable constituents. Small amounts of unstable constituents in the copolymers may for example be degraded by heating and removed. Since however the copolymers and also the homopolymers of trioxane are susceptible to degradation by acids, like acetals generally, thermal degradation of the unstable constituents and also any further processing of the melt can in general only be carried out if the acid polymerization catalyst contained therein is first washed out or rendered inactive.

Thus polyacetals which have been prepared by polymerizing trioxane with boron fluoride or its coordination complexes have already been treated with organic amines or inorganic bases. For effective removal of the catalyst it is necessary in general to treat the crude polymer several times with solutions of basic compounds which are used in excess. This method is cumbersome and expensive. Moreover even small amounts of excess neutralizing agent, which may be present in polymers treated in the above way, cause discoloration when melting the polymers.

We have now found that the polymerization catalyst contained in polyacetals obtained by polymerizing in a conventional way a monomer mixture consisting essentially of trioxane in the presence of a catalyst selected from the group consisting of boron trifluoride and a boron trifluoride coordination complex can be inactivated particularly advantageously by adding from 0.01 to 5% by weight of a neutral metal halide selected from the group consisting of lithium fluoride, lithium chloride, sodium fluoride, sodium chloride, potassium fluoride, potassium chloride, calcium fluoride, strontium fluoride and barium fluoride, and melting and homogenizing the resultant composition.

Suitable polyacetals are the well-known compounds obtained by polymerizing a monomer mixture consisting essentially of trioxane in the presence of boron trifluoride or a boron trifluoride coordination complex, the monomer mixture being in general made up of at least 80 mole percent trioxane and up to 20 mole percent of a monomer copolymerizable therewith. Examples of monomers copolymerizable with trioxane are cyclic ethers and cyclic acetals of the formula

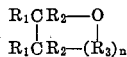

where $R_1$ and $R_2$ are H and/or lower alkyl and/or lower halogen substituted alkyl radicals and $R_3$ is methylene and/or an oxymethylene and/or lower alkyl and/or haloalkyl substituted methylene radical and/or a lower alkyl and/or haloalkyl substituted oxymethylene radical, and $n$ is an integer of from 0 to 3. Examples are ethylene oxide, propylene oxide, trimethylene oxide, epichlorohydrin, styrene oxide, 1,3-dioxolane, 1,3-dioxane, tetramethylene glycol formal or diethylene glycol formal. Cyclic lactones, such as β-propiolactone, may also be used as comonomers for trioxane. Other compounds which may be used in small amounts are those which contain more than one cyclic ether or cyclic acetal group in the molecule, e.g., butadiene diepoxide. Trioxane may also be polymerized with boron trifluoride catalysts in the presence of polymeric ethers and acetals, such as polyformals, e.g., polydioxolane. In all cases polyacetals are obtained which in general have melting points above 150° C. and polymer chains containing (a) 80 to 99.9 mole percent of oxymethylene (—OCH$_2$—) units interspersed with (b) 0.1 to 20 mole percent of —O—R— units where R is a divalent radical containing at least two carbon atoms directly linked to each other and positioned in said chain between the two valences, any substituents in said radical R being inert.

The polymers are prepared by conventional methods in the presence of boron trifluoride or a coordination complex thereof, for example a coordination complex with a compound in which the donor atom is oxygen or sulfur, such as coordination complexes of boron trifluoride with ethers, ketones, anhydrides, esters or dialkylsulfides. Coordination complexes with diethyl or dibutyl ether are preferred.

The invention does not relate to the polymerization of the acetals which may be carried out by conventional methods, but rather to the inactivation of catalyst residues containing boron trifluoride in polyacetals thus prepared, by adding small amounts of neutral chlorides or fluorides of alkali metals or alkaline earth metals and melting and homogenizing the resulting mixture.

The above-mentioned salts are added to the crude polymers (which may contain not only the polymerization catalyst but also unreacted monomers) in general in amounts of 0.01 to 5% by weight, preferably 0.05 to 1% by weight, but at least in an amount which is stoichiometric with the boron trifluoride content. It is a particular advantage of the invention that the metal halides, usually added in excess, not only inactivate the catalyst but also promote crystallization in the processing of the polyacetals, for example by injection molding, and that they do not cause any discoloration during melting.

The alkali metal or alkaline earth metal chlorides or fluorides may be mixed with the polyacetals either in solid form or in the form of solutions or suspensions in water or in organic solvents which are inert to polyacetals. If aqueous solutions of metal halides be used, the polyacetal is preferably dried in vacuo at 20° to 150° C. prior to melting; in this way the unreacted monomers are removed together with the water and may be recovered from the condensate. If suspensions of metal halides in organic solvents be used for the treatment, the solvent used, which may contain unreacted monomers, is preferably separated from the polyacetal by filtration.

Melting and homogenizing of the mixtures obtained advantageously takes place under an inert gas or under subatmospheric pressure, for example in degassing extruders, in agitated vessels or on rollers or the like, any unstable constituents contained in the copolymers being thus degraded and removed. Before, during or after the melting it is possible to add to the copolymers to which metal halides have been added according to this invention, other prior art stabilizers against heat and oxygen, for example polyamides, amides, vinyl polymers having lateral amide groups, methylolamides, aminoplasts, ureas and the like, phenolic antioxidants, α-N-substituted hydrazones and the like, and also UV rays absorbing agents, compatible fillers and pigments.

The invention will be further illustrated by the following examples. Parts specified in the examples are parts by weight.

EXAMPLE 1

A mixture of trioxane (97 parts) and polyethylene glycol formal (3 parts) is melted and copolymerized by means of boron trifluoride dibutyl etherate (0.006 part). The copolymer obtained is ground.

Batches of 20 parts of the ground crude copolymer have added to them 0.3% by weight of the metal halides set out in Table I by mixing the crude polymer with a solution or suspension of the metal halide in water/methanol and then drying the mixtures in vacuo at 80° C. The dried mixtures are melted in glass tubes in vacuo at 200° to 210° C. and kept at this temperature for one hour. After the mixtures thus treated have been cooled and reduced in size, their stability is determined by heating samples thereof for 2 hours at 222° C. in a nitrogen atmosphere and determining the loss in weight (see Table I).

*Table I*

| Sample | Metal halide | Loss in weight in stability test, percent | Color of sample after stability test |
|---|---|---|---|
| 0 | | 4.76 | Almost white. |
| 1 | Sodium fluoride | 0.67 | Do. |
| 2 | Potassium fluoride | 0.8 | Ivory. |
| 3 | Calcium fluoride | 1.24 | Almost white. |
| 4 | Sodium chloride | 1.60 | Do. |

For comparison, an equal amount of sodium carbonate is added to the ground crude polymer. Brown discoloration occurs even upon melting in vacuo. Samples of the ground crude polymer which contain equal amounts of organic amines, such as butylamine or pyridine, show yellow discoloration when melted in vacuo.

EXAMPLE 2

500 parts of the same ground crude polymer as in Example 1 is mixed in a metal vessel provided with a stirrer and capable of being heated, with 0.15 part of soduim fluoride, 100 parts of water and 150 parts of methanol. Water and methanol are then distilled off in vacuo (50 mm. Hg), the temperature being raised to 100° C. After distillation, the remaining solid is heated to 210° to 220° C. and the resultant molten mixture is kept at this temperature for ninety minutes. After the mixture has been cooled and reduced in size, a sample thereof shows a loss in weight of 0.73% after two hours at 222° C. under nitrogen. After adding 0.3% of a condensate of dimethylolisophthalic diamide and ethyleneurea and 0.10% of benzaldehyde-(α-N-methyl)phenylhydrazone, the pretreated copolymer is extruded in a screw extruder without any change in stability.

EXAMPLE 3

10 parts of a copolymer prepared as in Example 1 is mixed with 0.5% by weight of sodium fluoride in the way described in Example 1. Another 10 parts of the copolymer is treated in the same way but without adding sodium fluoride. Stability is measured by heating samples for 120 minutes at 222° C. while passing nitrogen over them and separately determining the amount of formaldehyde split off during the first forty minutes and that split off during the next eighty minutes. The results are given in Table II.

*Table II*

| Sample | Amount of formaldehyde split off (in percent of the sample) at 222° C. under nitrogen in the period from— | |
|---|---|---|
| | 0–40 minutes | 40–120 minutes |
| 0 without sodium fluoride | 9.7 | 2.2 |
| 1 with sodium fluoride | 8.9 | 0.44 |

EXAMPLE 4

A mixture of 95 parts of trioxane and 5 parts of 1,3-dioxolane is melted and copolymerized using 0.0045 part of boron trifluoride dibutyl etherate. The crude copolymer is ground. 0.5 wt. percent of lithium fluoride, strontium chloride and barium fluoride is added to three batches of 20 parts of ground crude copolymer in the way described in Example 1. The mixtures were processed and tested as described in Example 1. The samples have the properties specified in Table III.

*Table III*

| Sample | Metal halide | Loss in weight in stability test, percent | Color of sample after stability test |
|---|---|---|---|
| 0 | | 1.44 | Almost white. |
| 1 | Lithium fluoride | 0.8 | Do. |
| 2 | Strontium chloride | 0.7 | Do. |
| 3 | Barium fluoride | 0.82 | Do. |

We claim:
1. Method for working up polyacetals selected from the group consisting of a solid polyoxymethylene homopolymer and copolymers having melting points above 150° C. and having polymer chains containing (a) 80 to 99.9 mol percent of —OCH$_2$— units interspersed with (b) 0.1 to 20 mol percent of —O—R— units in which R is a divalent radical containing at least two carbon atoms directly linked to each other and positioned in the polymer chain between the two valences of R, any substituents in R being inert, said polyacetals containing therein a catalyst selected from the group consisting of boron trifluoride and a boron trifluoride coordination complex, said method comprising
 (a) adding from 0.01 to 5% by weight of a neutral metal halide selected from the group consisting of lithium fluoride, lithium chloride, sodium fluoride, sodium chloride, potassium fluoride, potassium chloride calcium fluoride, strontium fluoride and barium fluoride, and
 (b) melting and homogenizing the resulting composition.

2. The method of claim 1 wherein the amount of said neutral metal halide added is from 0.05 to 1% by weight.

3. The method of claim 1 wherein the neutral metal halide added is sodium fluoride.

4. Polyacetals selected from the group consisting of a solid polyoxymethylene homopolymer and copolymers having melting points above 150° C. and having polymer chains containing (a) 80 to 99.9 mol percent of —OCH$_2$— units interspersed with (b) 0.1 to 20 mol percent of —O—R— units in which R is a divalent radical containing at least two carbon atoms directly linked to each other and positioned in the polymer chain between the two valences of R, any substituents in R being inert, said polyacetals containing therein a catalyst selected from the group consisting of boron trifluoride and a boron trifluoride coordination complex and worked up by a method comprising
(a) adding from 0.01 to 5% by weight of a neutral metal halide selected from the group consisting of lithium fluoride, lithium chloride, sodium fluoride, sodium chloride, potassium fluoride, potassium chloride, calcium fluoride, strontium fluoride and barium fluoride, and
(b) melting and homogenizing the resulting composition.

References Cited by the Examiner

UNITED STATES PATENTS

| | | | |
|---|---|---|---|
| 2,246,915 | 6/1941 | Dangelmajer | 260—45.7 |
| 2,989,509 | 6/1961 | Hudgin et al. | 260—67 |
| 3,027,352 | 3/1962 | Walling et al. | 260—67 |
| 3,061,580 | 10/1962 | Erickson et al. | 260—45.7 |

WILLIAM H. SHORT, *Primary Examiner.*

L. M. MILLER, *Assistant Examiner.*